Aug. 23, 1927.
A. L. KNAPP
1,639,890
MOTOR VEHICLE
Filed April 5, 1924
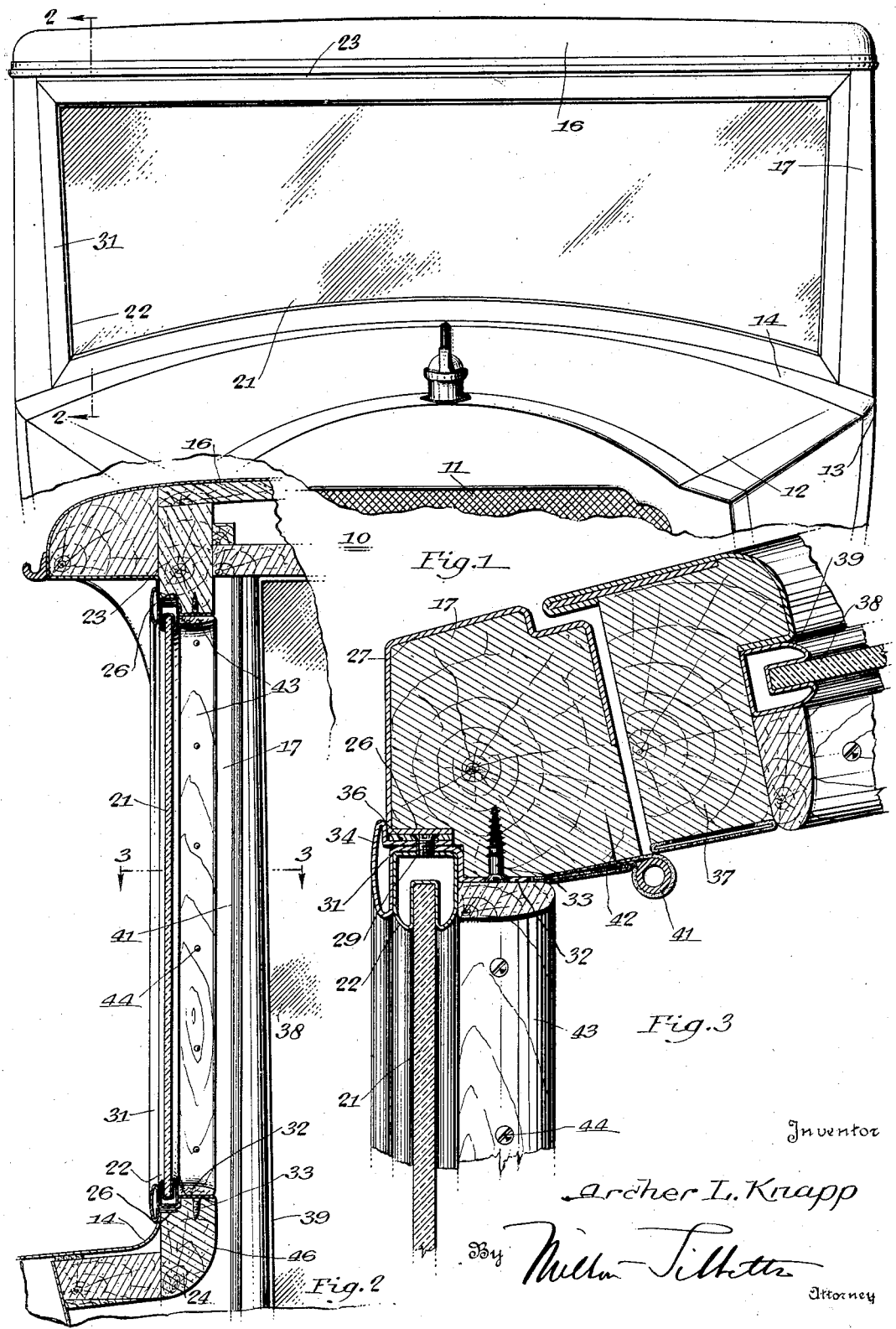
Inventor
Archer L. Knapp
By Miller Sibbetts
Attorney Patented Aug. 23, 1927.

1,639,890

UNITED STATES PATENT OFFICE.

ARCHER L. KNAPP, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed April 5, 1924. Serial No. 704,308.

This invention relates to motor vehicles, particularly to bodies therefor, and it has for one of its objects to provide a motor vehicle body having a non-adjustable one-piece windshield which shall be strong and rigid, and which shall prevent the entrance of wind and rain to the vehicle.

Another object of the invention is to provide a motor vehicle body with a one-piece windshield fixed in position, which may be readily removed therefrom.

A further object of the invention is to provide a motor vehicle body having a rigidly positioned windshield which shall be superior in appearance to windshields heretofore constructed, and less expensive to manufacture.

Other objects of the invention will appear from the following description taken in connection with the drawings, which form a part of this specification, and in which:

Fig. 1 is a front elevation of the portion of a motor vehicle having a body constructed in accordance with this invention;

Fig. 2 is a longitudinal section through a portion of the motor vehicle body illustrated in Fig. 1, taken substantially on the line 2—2 of Fig. 1, and Fig. 3 is a horizontal section through a portion of the vehicle body, taken substantially on the line 3—3 of Fig. 2.

The present type of motor vehicle body is provided at its forward end with a transparent windshield, which is usually of glass supported in suitable framing. Such windshields sometimes have a single pane of glass, but ordinarily they are constructed in two sections, arranged one above the other. One or both of these sections are pivotally mounted on stanchions or side supports, so that they may be adjusted at various angles with respect to the vehicle body. The purpose of such adjustable mounting is to enable opening of the sections to provide ventilation for the interior of the vehicle body, and sometimes to permit clearer vision for the vehicle driver when the windshield is blurred by rain or snow.

Such pivotal mounting of vehicle windshields has been attended by certain difficulties. The structure supporting such shields is necessarily weak and this necessitates the provision of supporting stanchions or pillars which are unduly large and heavy, and the pivotal supports of the windshield have also almost invariably developed squeaks and rattle in service It is also necessary to provide sufficient clearance between the sides of the windshield and the supporting stanchions to effect adjustment of the pivoted section on its supports, and when two-piece shields are used, a joint between the sections is necessitated, which is unsightly, which interferes with vision, and through which the leakage of wind, rain, snow, etc. is likely to occur. The cost of manufacture of the pivoted supports and their clamps is also high.

It has been customary in high grade modern vehicles, particularly those equipped with closed bodies, to provide easily adjustable side windows, and cowl ventilators of ample proportions, so that adjustability of the windshield for purposes of ventilation is not a major necessity as was the case with vehicle bodies previously constructed.

In the present invention is provided a fixed one-piece windshield which is strong and weather-tight, which has no parts susceptible to rattles, which does not hinder or obscure the vision of occupants of the vehicle, and which is readily removable from the vehicle body.

Referring to the drawing, at 10 is shown a motor vehicle having the usual radiator 11 and hood 12, and provided with a body 13, mounted upon the vehicle in the usual manner. Between the hood 12 and the body proper is a cowl 14. As shown, the body 13 is of the closed type but it is to be understood that the invention is not limited to this type but is applicable to any motor vehicle body. The body of the vehicle is provided with a suitable roof 16 supported at its forward corners on pillars or stanchions 17, which connect it with a frame member 24 of the cowl 14. The roof 16 of the vehicle also has a lateral frame member 23 at its forward end, which is connected by the stanchions 17 with the cowl cross member 24 to form a supporting frame for the vehicle windshield.

This windshield constitutes an assembly having a single transparent window, preferably consisting of a single pane of glass 21, mounted in a suitable rim or frame 22, which may be of the ordinary hollow grooved molding adapted to embrace the edges of the glass.

The frame members 23 and 24 and the stanchions 17 are provided with a forwardly disposed rabbet 26 which is adapted for the reception of the windshield rim 22. It is to be understood that the body members of the vehicle support the usual metal sheathing 27, which forms the closure for the vehicle body. This sheathing is preferably turned in over the front edge of the rabbet 26, as clearly shown in Fig. 3.

Secured to the windshield rim 22 in any convenient manner, as by screws 29, is a retaining molding 31, conveniently formed of pressed metal, having a portion of channeled configuration adapted to embrace the rim 22 and to fit within the rabbet 26. This molding 31 is provided with a rearwardly disposed flange portion 32 adapted to be secured to the stanchions 17 and to the members 23 and 24 in any convenient manner as by means of the screws 33. It is also provided with a transversely disposed portion 34, adapted to cover the joint between the frame 22 and the sheathing 27 outside the vehicle, as clearly shown in Figs. 2 and 3. A packing strip 36 may be secured to the molding 31 by means of the screws 29 if so desired.

It will be seen that the portion of the molding 31 which is adapted to embrace the windshield rim 22 abuts against the inner face of the rabbet 26 and is rigidly held thereagainst by the screws 33 so that motion of the windshield rim 22 relative to the vehicle body is obviated.

The stanchions 17 are adapted to cooperate with the body frame members 37 which support a door or window for the vehicle body. This door or window is preferably provided with a suitable glass 38, mounted in the usual rim 39, which is adapted to be raised or lowered by any of the well known devices for this purpose (not shown). The joint between the members 17 and 37 inside the vehicle is preferably covered by a windlace 41 of usual form, which may be secured to the member 17 as by means of tacks 42. The stanchions 17 and the members 23 and 24 are also provided, interiorly of the body, with suitable finish molding 43, secured thereto in any convenient manner as by the screws 44. The forwardly disposed faces of the molding 43 are adapted to abut the maintaining a tight joint between this rim and the molding 31. The molding 43 is also adapted to bind the edge of the windlace 41 and the covering 46 for the frame member 24, and serves to conceal the screws 33 by which the molding 31 is secured in place.

It will be evident that this structure provides a strong and rigid windshield construction which is secured to the vehicle body in such a manner as to dispense with the squeaks and rattles incident upon the usual pivoted construction. It will also be evident that the windshield thus provided provides a weather-tight front for the vehicle body, through which no leakage of wind and rain is possible. The windshield may be readily assembled with its retaining molding 31 which is then placed in position in the rabbet of the body members 17, 23 and 24, and secured by the screws 33. The molding 43 is subsequently placed in position. This windshield assembly can also be readily removed in a similar manner. Because of the elimination of the pivoted supports the cost of manufacture and assembly is also greatly reduced.

It will be understood that various forms of the invention other than those described above may be used without departing from the spirit or scope of the invention.

What is claimed is:

1. The combination with a motor vehicle having a body of the closed type, of front corner stanchions for said body, cross members connecting said stanchions at the top and bottom thereof to form a frame, a windshield assembly including a metal frame having a single pane of glass rigidly secured therein, molding secured to said metal frame and means associated with the moulding for removably securing the said assembly rigidly in said body frame.

2. The combination with a motor vehicle having a body, of cross members and stanchions arranged to form a frame defining a forwardly disposed opening and rabbeted at its forward face, a windshield assembly comprising a single integral pane of glass and a frame therefor, and means including molding having a rearwardly disposed flange for removably securing the windshield frame in the rabbet.

3. The combination with a motor vehicle body, of cross members and side members forming a frame at the forward end thereof, said frame having a forwardly disposed rabbet, a unitary windshield having a rim, and a molding having a portion adapted to embrace the rim and to fit in said rabbet and another portion adapted to cover the joint between the frame and the rim, the first named portion having a projecting flange adapted to be removably secured to the frame body, of cross members and side members forming a frame at the forward end thereof, said frame having a forwardly disposed rabbet, a unitary windshield having a rim, molding having a portion adapted to embrace the rim and to fit in said rabbet and another portion adapted to cover the joint between the frame and the rim, the first named portion having an inwardly projecting flange adapted to be removably secured to the frame, and beading secured to the frame adapted to conceal said flange.

In testimony whereof I affix my signature.

ARCHER L. KNAPP.